W. M. Williams,
Lock.
N° 1,874.   Patented Dec. 1, 1840.
Fig 18
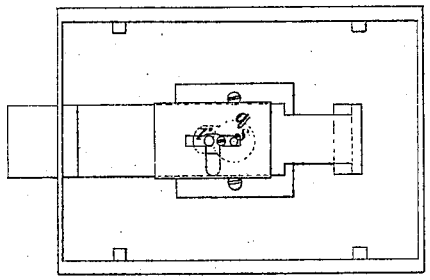
Fig 20
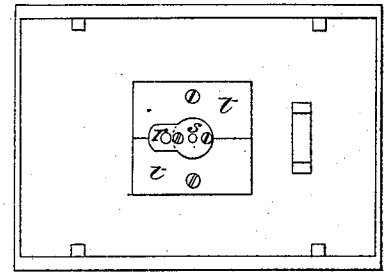
Fig 19
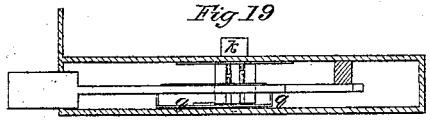
Fig 21
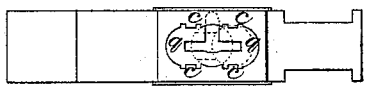
Fig 23, Fig 22, Fig 26, Fig 27, Fig 28
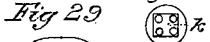
Fig 29, Fig 24, Fig 25
Fig 31
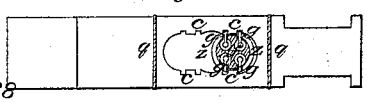
Fig 30
Fig 32
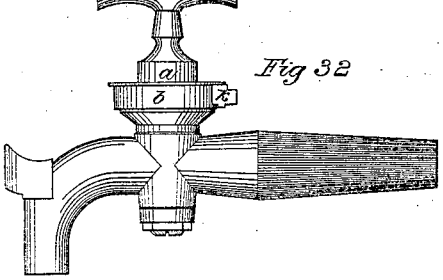
Fig 34
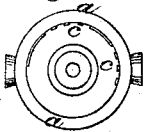
Fig 36
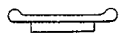
Fig 37
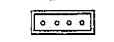
Fig 33
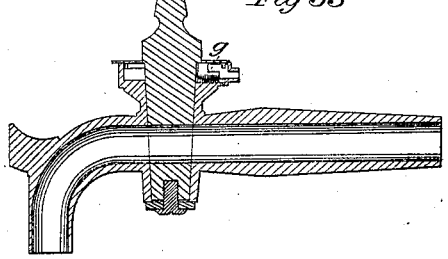
Fig 35
Fig 38, Fig 39
Witnesses:                                 Inventor:

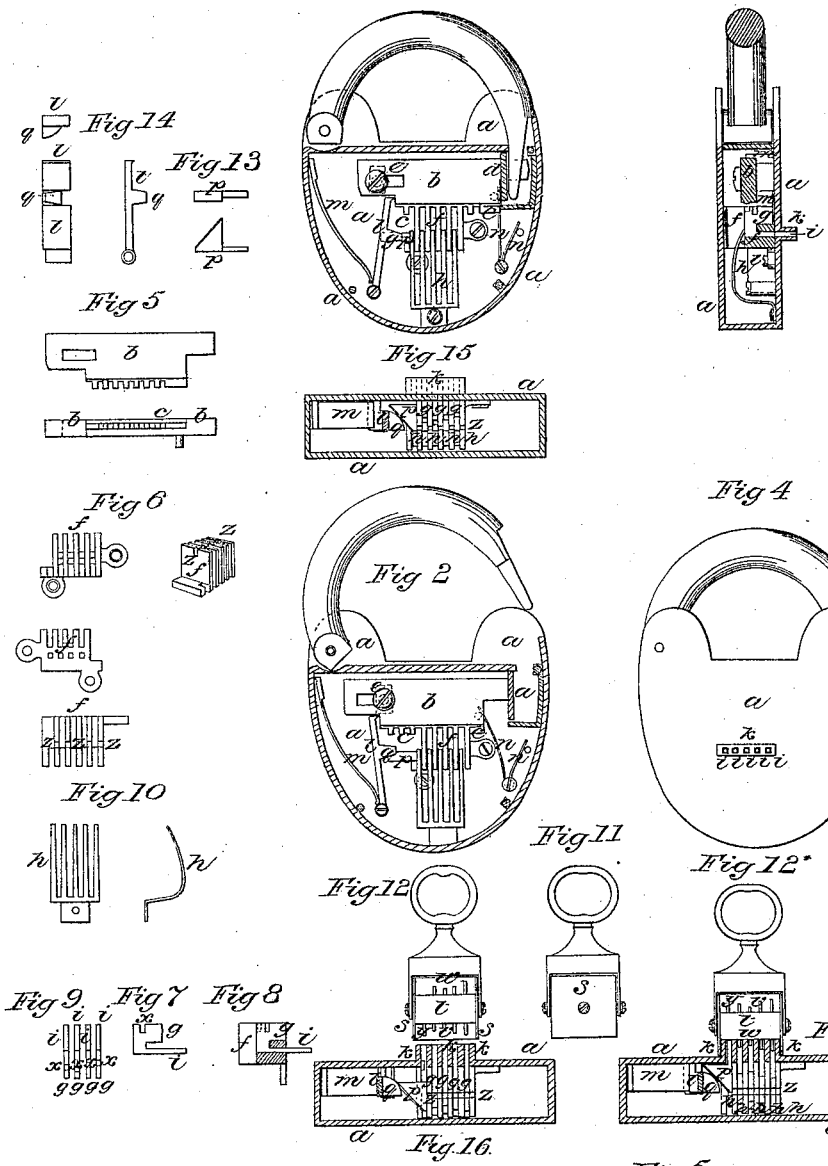

UNITED STATES PATENT OFFICE.

WILLIAM MORRETT WILLIAMS, OF MILE END, ENGLAND.

LOCK AND KEY.

Specification of Letters Patent No. 1,874, dated December 1, 1840.

*To all whom it may concern:*

Be it known that I, WILLIAM MORRETT WILLIAMS, a subject of the Queen of Great Britain, now residing at No. 1 Bedford Place, Commercial Road, in the hamlet of Mile End, Old Town, in the county of Middlesex, England, late of the Royal Military College, and professor of mathematics, have invented or discovered a new and useful invention of an Improved Lock and Key; and I do hereby declare that the following is a full and exact description thereof.

My improved lock and key are constructed with peculiar and novel combinations of mechanism intended to supersede the necessity of tumblers as used in most of the patent locks at present known.

This peculiar mechanism I shall describe by reference to the accompanying drawings, first in the form of a padlock which is shown at Figure 1, the back plate of the lock being removed for the purpose of exhibiting the parts within. The same is also shown at Fig. 2, the internal parts being in a different position (viz.), Fig. 1 represents the bolt shot forward into the staple or bolt hole of the jointed shackle that is locked. Fig. 2 represents the same unlocked; or the bolt withdrawn from the shackle. Fig. 3 is a section taken transversely through the middle of the lock in a vertical direction and Fig. 4 is the external appearance of the face of the lock, the similar letters referring to the same parts in all these figures. The case or frame of the lock is represented at $a, a$, the bolt at $b$ which is shown detached in two positions at Fig. 5. On the lower edge of the bolt a rack or series of teeth $c$, is formed. The end or tongue of the bolt is supported and slides in the guide socket $d$ of the framing and is guided in its sliding action by the screw $e$ passed through a slot in the tail part of the bolt. Fig. 6 represents in four positions (one of them being in perspective) the rack box $f$, which is fastened to the lock plate immediately under the bolt as shown in Figs. 1, 2 and 3. It will be perceived by inspecting two of the views shown in Fig. 6 that a longitudinal groove Z, Z, is cut in the upper part of this rack box in which the rack $c$ on the under side of the bolt is intended to slide. Fig. 7 is a side view of one of the several sliding pieces $g$ of which there are four employed in this lock acting as guards to prevent the bolt being slidden or moved from either its locked or unlocked position. These sliding pieces $g$ are to be inserted into the recesses or open parts of the rack box $f$ one of which is shown in the vertical section of the rack box at Fig. 8. Fig. 9 represents the upper edges of these four sliding pieces $g\ g\ g\ g$ in each of which there is a notch $x$ cut at a different distance from their several faces. Fig. 10 represents a forked spring $h$ in two positions. The ends of the forks of this spring when fixed to the lock plate as at Figs. 1, 2 and 3 fall into the perpendicular recesses or open parts in the rack box $f$ and severally act against the faces of the sliding pieces $g$. These sliding pieces have each a tail or elongated part $i$ which is intended to be passed through the face plate of the lock as shown in the transverse section of the lock at Fig. 3. On the face plate of the lock seen in Fig. 4, a socket piece or key guide $k$ is affixed with holes for the tails $i$ of the sliding pieces to pass through, their extremities standing flush with the outside of the socket. Fig. 11 represents the key or instrument by which these sliders may be moved for the purpose of locking and unlocking and Fig. 12 is the same, the face plate of the key being removed in order to show the parts within. The bolt $b$ is projected forward into the locking position as shown in Fig. 1 by a lever $l$ acted upon by a powerful main spring $m$ and the bolt is slidden backward or unlocked as shown in Fig. 2 by a feather spring $n$; a sliding piece $p$ having an inclined plane (as seen in the detached Fig. 13) being at that time pressed against a tooth $q$ on the side of the lever $l$ (see also the detached Fig. 14) which by withdrawing the lever $l$ allows the feather spring $n$ to throw the bolt back. Figs. 15, 16 and 17 are sections taken through the padlock in horizontal directions at the level of the top of the rack box $f$ for the purpose of showing different positions of the sliders $g$, Fig. 15 representing their quiescent state when the bolt is projected outward corresponding to Fig. 1 and Fig. 16 when the sliders are shifted by the key in order to allow the bolt to be slidden back as in Fig. 2.

Now supposing the bolt to be projected, that is, locked as in Fig. 1 in order to unlock it the key shown at Fig. 12 must be applied to the front of the socket $k$. This key is formed by a rectangular box $s, s$, which contains two series of pins or punches of various lengths fixed in a central block $t$, The key box is mounted upon an axis or pivots which enable it to be turned over in its carriage or handle so that either of the series of punches may be applied to the socket $k$ (which is a substitute for the key-hole) one of the series of punches as $v$ is for the purpose of interlocking; the other $w$ for locking. By referring to Fig. 15 (which represents the sliders in their quiescent state after the bolt has been projected as in Fig. 1) it will be perceived that the ends of the tails of the sliders are coincident or flush with the front of the socket $k$ but that the notches in the several sliders are then at variable distances from the front.

It will be understood that the rack $c$ at the underside of the bolt is continually in the groove $z$ of the rack box $f$ (see Fig. 1) and it will be perceived that the several sliders $g$ in the recesses of the rack box at this time stand in the notches between the teeth of the rack $c$ thereby confining and preventing the bolt from being moved along the groove $z$. In order therefore to unlock, that is to throw back the bolt all the sliders $g$ must be first pushed into such situations as will bring their notches $x$ into exact coincidence with the groove $z$ in the rack box. This is to be done by applying the key to the face of the lock at the socket $k$ and pressing it straight forward. The several plugs or punches of the key being fixed in the block $t$ at different lengths suited to distances to which the sliders are to be moved, their pressure against the front ends or tails of the sliders will force all the sliders inward and cause their notches $x$ to be severally brought into coincidence with the groove $z$ as seen in Fig. 16. For the purpose of unlocking or throwing back the bolt the part $v$ of the key is to be employed which has five pins or punches; the fifth pin or punch $y$ being designed to act against the tail of the sliding piece $p$. The key having been thus applied and the sliders $g$ $g$ $g$ $g$ and $p$ all brought into the situations seen at Fig. 16 the inclined plane of the slider $p$ by pressing against the bevel tooth $q$ on the lever $l$ will cause that lever to be forced back into the position shown in Fig. 2 when the notches $x$ in the sliders $g$ being all at the same time brought into coincidence with the groove $z$ the rack of the bolt will be set at liberty and the bolt be immediately thrown back by the power of the feather spring $n$ into the unlocked position as Fig. 2. On withdrawing the key the forked spring $h$ acting against the faces of all the sliders they will be passed through the notches of the rack $c$ under the bolt into the situations shown at Fig. 15 by which the bolt will be held firmly in the unlocked position.

In order to project the bolt into the locked position as represented at Fig. 1, the box of the key must be turned over and the series of pins or punches $w$ be now applied to the socket $k$ as in Fig. 12 to act against the tails $i$ of the sliders $g$ which on being pressed home will push back the sliders so as to bring all their notches $x$ into coincidence with the groove $z$ of the rack frame as shown in the section at Fig. 17 when the power of the main spring $m$ acting against the lever $l$ will cause the rack of the bolt to slide freely along the groove and hence the bolt to be projected into the locked position seen at Fig. 1. The withdrawing of the key will again allow the forked spring $h$ to force all the sliders $g$ forward through the rack of the bolt into the situations shown in Fig. 15 when the bolt as before will remain securely held in the locked position. I would here observe that though I have shown in the drawing and described a rack of teeth $c$ at the under side of the bolt I do not intend to confine myself to that particular form of rack as a similar object might be obtained by inserting pins in place of the teeth in the under part of the bolt or a series of perforations might be made in a rib under the bolt as shown in the auxiliary Fig. 5* in which case it would be necessary to make the sliders $g$ in the form shown in the auxiliary Fig. 7* the operation being as before described to push back the sliders into such positions as will bring their notches $x$ into exact coincidence with the rib or rack $c$ when the bolt will be released and enabled to slide freely. It may further be proper to state that I do not intend to confine myself to the use of four sliders $g$ as any other less or greater number of sliders might answer provided sufficient security is obtained or the mechanism be not made cumbrous by their multiplication. Neither is it necessary that the key be furnished with two series of pins $v$ and $w$ as one series might be made to move the sliders both for locking and unlocking if the pin $y$ applied to the slider $p$ be held by a spring catch and be made capable of receding from the tail of the slider $p$ when the bolt is to be projected into the locked position. The bolt also may be moved to and fro by an external button or thumb piece without employing the main spring and driver or the feather spring. As however the same principle of construction is susceptible of some modifications both in form and arrangement I have represented in the accompanying drawing at Fig. 18 a lock for a door in which my novel principle of construction is modified to suit a rotary key. Fig. 19 represents the lock in horizontal section and Fig. 20 the lock as Fig. 18 but from which the bolt has been removed in order to show the parts behind more distinctly. The reverse side of the bolt is represented detached at Fig. 21.

Instead of the square rack box represented at *f* and Fig. 6 in the former construction I in this instance, employ a cylindrical rack box shown in several detached views and sections. Fig. 22 is an external view of the cylindrical rack-box with the sliders within it. Fig. 23 shows the end of the cylindrical rack box as it would appear when protruded through the face of the lock and which is the substitute for a key hole corresponding to the socket *k* in the former construction. Fig. 24 is the reverse or back end of the cylindrical rack box; the end plate shown at Fig. 25 being removed. Fig. 26 represents the cylindrical rack box (as Fig. 22) cut through in vertical section for the purpose of exhibiting the internal forms of its passages and recesses and the situations of the sliders and springs within. Fig. 27 is one of the sliders *g* detached of which there are four employed as substitutes for the sliders shown before at Fig. 7 and Fig. 20 is one of the spiral springs *h* for pressing up the sliders of which there are four instead of the forked spring shown at Fig. 10 each acting in one of the recesses of the cylinder against the end of one of the sliders as seen in Fig. 26. On the face of the bolt of this lock see Figs. 10 and 19 a plate *q* is fixed in which a T formed opening is cut for the studs *r* and *s* in the plate attached to the end of the cylindrical rack box (see Figs. 22 and 25) to act in. By means of these studs working in the T formed opening a rotary movement given to the rack box by the key causes the bolt to be slidden to and fro. In the reverse side of the bolt another opening is cut having a double rack *c, c, c, c*, shown in Fig. 21 which rack answers to that marked *c* under the bolt *l* in Figs. 1, 2 and 5 and acts in the circular groove *z z* around the middle of the cylindrical rack box (see Fig. 22). This cylindrical rack box is attached to the lock plate by means of two pieces of thin plate *t, t*, shown in Fig. 20 the circular edges of which take into a circular groove *v, v* formed around the rack box as seen at Fig. 22. When these thin plates *t t* are fastened to the lock plate the rack box is securely attached to the lock as seen in Fig. 20 but is capable of being turned around freely.

The parts of the lock being put together as shown in Figs. 18 and 19 and the rack *c, c*, of the bolt being in the groove *z, z* of the rack box, the bolt will be prevented from moving by the slides *g, g* in the rack box lying in the notches between the teeth of the rack *c, c*, as seen in the auxiliary section of the bolt with the rack *c, c* and of the rack box *f*, Fig. 31. It will now be perceived that by pressing the end of the key Figs. 29 and 30 against the outer end of the cylindrical rack box seen at Figs. 19, 22, 23 and 26 that the pins or punches in the key will act against the tail of the sliders *g* (see Fig. 26) forcing them back against the springs, until their notches *x x* are brought into coincidence with the groove *z* in the cylindrical rack box. The groove *z* will then be completely open all around and the racks *c, c*, of the bolt will be enabled to pass through without obstruction. The key being then turned around the bolt will be projected forward into the locked position or backward into the unlocked position, and on withdrawing the key the spring will force all the sliders outward again as at Figs. 26 and 31 and cause them to remain between the teeth of the rack *c, c*, so as to confine the bolt in the locked or unlocked position in which it was left.

Another modification of the principles of my improved lock adapted to the cock or tap of a cask or other vessel for containing liquors is represented in the following figures. Fig. 32 is an ordinary liquor cock with the locking apparatus attached to it. Fig. 33 a vertical section of the same. Fig. 34 is a horizontal view of the cock, the plug being withdrawn in order to show the locking apparatus and Fig. 35 the under part of the cap plate at the top of the plug—this cap plate *a* is circular, covering a cylindrical box *b* which contains the mechanism of the lock and at the back is a socket *k* to which the key shown in two views at Figs. 36 and 37 is to be applied. A rack box *f* shown detached at Fig. 38 is formed with passages at Figs. 6 for the reception of a series of sliders *g, g*, one of which is represented detached in two views at Fig. 39. These sliders are placed in the rack box as represented at Fig. 34 their tails passing through the socket *k* and behind each slider there is a spring keeping them steadily and up to their proper bearings. In each slider there is a notch *x* and in the rack box a groove *z*, as before described and the key furnished with pins or punches being applied to the socket *k* presses all the sliders into such situation as will bring all the notches *x* into coincidence with the groove *z* in the rack box.

The under part of the cap plate, Fig. 35, has a circular rib or bead, part of which is cut into teeth forming the racks *c, c*. This rib when the cap plate is put on as shown in the section Fig. 33 acts in the groove *z* in the rack box and when the plug of the cock stands either in the open or closed position the sliders *g* in the rack box will lie between the teeth of the rack *c* and thereby prevent the plug from being turned around but on applying the key to the socket and forcing the sliders back so that their notches shall coincide with the groove *z* the plug may be turned around and the way for the flow of the liquor opened or closed in which situation the cock will become locked by the return of the sliders the plug being prevented from turning until it is released by the application of the key.

Having thus fully described the nature of my improvement, and exemplified the manner in which the principle upon which I proceed may be so varied as to adapt it to door, or other, locks, what I claim therein, and desire to secure by Letters Patent, is—

1. The manner in which I have combined the rack on the bolt, the rack box, the sliding pieces *q*, and the respective springs, lever, and other parts, so as to be acted upon by means of the key, or instrument for opening and closing the same; the whole being constructed and operating substantially as herein set forth, in the application thereof to a padlock.

2. I also claim the application of the same principle, or general manner of construction, as herein exemplified, in its application to door locks, and to the securing of cocks, or taps, for the drawing of liquids, and also to all other objects and purposes to which it can be applied, while the principle of construction, and manner of operation, remain substantially the same, producing a like effect by analogous means.

In conclusion it will be perceived that the object of my improved lock is to obtain security against picking, opening, or unfastening which depends on forcing or pushing all the stops or sliders at one and the same time from the front or outside of the plate in order that the teeth or notches in the bolt may be released from the stops; for if any one of the sliders, should by a false key or other means be pushed too far or not far enough to bring their notches into exact coincidence with the rack the bolt must remain immovable.

In witness whereof I the said WILLIAM MORRETT WILLIAMS have hereunto set my hand and seal this twenty ninth day of August in the year of our Lord one thousand eight hundred and forty.

WILLIAM MORRETT WILLIAMS. [L. S.]

Witnesses:
T. W. WILIAMSON,
J. W. MOFFATT.